COMPUTER FORMAT CONTROL BUFFER

Filed Sept. 30, 1957 6 Sheets-Sheet 1

INVENTORS
THEODORE A. GALAS
CHARLES R. SUBLETT
BY Harry R. Lubcke
AGENT

COMPUTER FORMAT CONTROL BUFFER

INVENTORS
THEODORE A. GALAS
BY CHARLES R. SUBLETT
Harry R. Lubcke
AGENT

COMPUTER FORMAT CONTROL BUFFER

Filed Sept. 30, 1957 6 Sheets-Sheet 3

*INVENTORS*
THEODORE A. GALAS
CHARLES R. SUBLETT
*BY* Harry R. Lubcke
AGENT

Dec. 5, 1961 T. A. GALAS ET AL 3,012,230

COMPUTER FORMAT CONTROL BUFFER

Filed Sept. 30, 1957 6 Sheets-Sheet 4

INVENTORS
THEODORE A. GALAS
BY CHARLES R. SUBLETT
Harry R. Lubcke
AGENT

INVENTORS
THEODORE A. GALAS
CHARLES R. SUBLETT
BY Harry R. Lubcke
AGENT

COMPUTER FORMAT CONTROL BUFFER

Filed Sept. 30, 1957 6 Sheets-Sheet 6

INVENTORS
THEODORE A. GALAS
CHARLES R. SUBLETT
BY Harry R. Lubcke
AGENT

United States Patent Office 3,012,230

Patented Dec. 5, 1961

3,012,230
COMPUTER FORMAT CONTROL BUFFER

Theodore A. Galas, Santa Ana, and Charles R. Sublett, Orange, Calif., assignors to Electronic Engineering Company of California, Santa Ana, Calif., a corporation of California Filed Sept. 30, 1957, Ser. No. 686,946
13 Claims. (Cl. 340—172.5)

Our invention relates to data processing and particularly to means for formulating data according to the format required for an electronic computer or for similar electrically operated data processing equipment.

It is well known that electronic computers require specific formats of the data to be processed. Original binary data, or such data produced by an analog-to-digital converter usually occur as a random function with respect to the internal timing of a computer and may not be generated at a rate acceptable by a computer. Similarly, data formulated for processing by one type of electronic computer is ordinarily unsuited for processing by another type. Such data are frequently recorded on magnetic tape and thus constitute a package that may be re-used on a particular type of computer but may be wholly unusable on another.

For example, a certain class of electronic computer will not function unless digital data are impressed upon it at a rate of exactly 15,000 cycles per second and in groups of uniform length with a precisely uniform interval between groups. If these criteria are not met the computer ceases computing and sets up an error signal. Obviously, a device to provide the proper format is highly useful and this device must be one of precision. Makeshift or approximate apparatus is of no value because of an intolerable number of stoppages of computation.

Data may often consist of the telemetered flight information from a missile, which is obtained but once. It may be necessary or desirable to perform mathematical operations upon it of different kinds, requiring, as a practical matter, different formats for the data. Also, such information is often retained for a considerable period of time and new calculations made from it as the art progresses. In certain instances the mere availability of one type of computer as against another makes a revision of format highly desirable.

Differences in formats of well known computers are exemplified as follows. The language may be binary or binary coded decimal. The number of characters per word may be twelve, six or variable. The data may be entered in groups, or blocks, or fixed length of, say, twenty words, or this format aspect may be a preset variable. The number of bits per character may be six plus lateral parity or four plus lateral parity. Longitudinal parity is often employed but not invariably so.

It is therefore evident that "raw" data must be suitably grouped and provided with parity bits and perhaps other auxiliary information items before it is in the format acceptable by a given electronic computer. It is further evident that changing the basic data from one format to another often requires a rather thorough revision. Plural aspects of the grouping may need to be changed and parity bits may need to be inserted of altered.

While a need for automatically changing format by passing data through an apparatus evolved for this purpose has been known, this need has not been met. Rather, in instances of extreme importance, a very considerable amount of time has been spent to suitably alter and program a large computer to work inefficiently at such a task, or the data have been considered unusable with small computers of different format.

The initial cost and the cost of operation of our format control buffer is one-tenth that of the computer for which data is prepared for the most rapid possible actual calculation by the computer. A high economic justification exists for the format control buffer.

Briefly describing our invention, the initial data are reproduced in the form of electrical pulses from preceding electrical apparatus, such as an analog to digital converter, a magnetic tape reproducer, or telemetered flight information. These initial data are combined with additional bits of information, as derived from a parity generator. The format aspects of these data are also treated, as by preset block length counters, and the addition of longitudinal parity.

The basic portion of the apparatus comprises preferably a matrix type memory with all the control apparatus to read into the memory at whatever rate is inherent in the original data and to read out at a more rapid rate. Such processing allows that data to be grouped into necessary blocks. The blocks are recorded on new tape and the new tape transport stopped between blocks to allow the memory to again be filled with succeeding data. This accomplishes the fundamental aspect of the format change. In subsequent use in a computer the new tape is transported uniformly, supplying the computer with data in exactly the format required at the pulse density and input frequency required for optimum speed of processing, independent of whatever circumstances may have been unalterably imposed upon the form of the original data.

The final portion of the apparatus consists of a tape transport suitable for providing a tape having the characteristics required by the computer upon which the computations will be made. The start and stop signals for this transport and the provisions for spacing the data developed by the basic control apparatus of our buffer are important in this connection. This functioning places the data on the new tape in required blocks with specified spacing along the tape between blocks.

An object of our invention is to alter electrically represented data from one format to another.

Another object is to formatize "raw" data for most effective and rapid processing by a computer.

Another object is to provide apparatus to accept data at random rates and to record such data in a manner that allows reproduction at a prescribed rate.

Another object is to provide apparatus to insert auxiliary bits of information used in the functioning of specific electronic computers.

Another object is to provide apparatus to automatically alter the format of recorded data required for a given electronic computer to a different format required for another type of electronic computer.

Another object is to provide apparatus to transform initial data from the format and rate thereof to a new format and rate suitable for operating electric typewriters, teletypes, card punches, line printers and similar devices.

Other objects of our invention will become apparent upon reading the following detailed specification and upon examining the accompanying drawings, in which.

Figure 1:
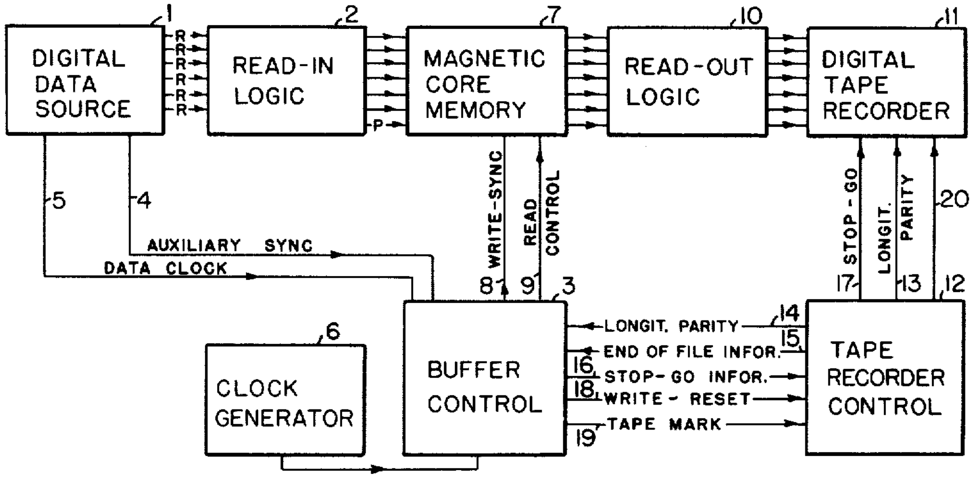
FIG. 1 shows the simplified block diagram of our format control buffer.

In FIG. 1 numeral 1 indicates a digital data source, which may be any of those previously mentioned. In this example, six bits, "R," are shown originating from the data and passing into the read-in logic 2. The read-in logic supplies auxiliary bits of information, as "P," that must enter the memory for the proper operation of subsequent processes according to the format involved.

Connection 4 from the source 1 to the control 3 is the auxiliary sync (synchronization) input. This allows the buffer to be reset from an external control signal to insure that the block length counters in the buffer control remain in synchronism with the data. Connection 5 is the data clock line. This controls writing data into the magnetic memory.

Clock generator 6 originates equally timed pulses at a number of kilocycles per second for timing functions in the control and thereby elsewhere in the format control buffer as a whole.

Magnetic core memory 7 accepts the data to be processed and stores it without modification until the buffer control 3 has determined that a sufficient amount has been stored so that it may be read out at a constant and desirable rate to form a complete block of data of the desired format. Memory 7 is preferably of the rectangular matrix type employing a large number of magnetic cores and is to be amenable to the address type of operation.

The six, for example, lines R carry the bits for a character plus a seventh, P, for lateral parity pass from the read-in logic 2 to memory 7. From control 3 write synchronization 8 and read control information also passes to the memory.

The read-out logic 10 contains an output register, end of file logic and equivalent elements.

From logic 10 the now partially formatized data passes to digital tape recorder 11, in coaction therewith the fully formatized data is produced. Recorder 11 is controlled by tape recorder control 12, which latter coacts intimately with the main buffer control 3. Longitudinal parity information originating in control 12 passes to both recorder 11 over path 13 and to control 3 over path 14. End of file information proceeds from recorder control 12 to buffer control 3 via path 15.

Stop-go information for the recorder originates in buffer control 3 and passes to recorder control 12 over path 16 for subsequent transmission to tape recorder 11 over path 17. Write and reset information originates in buffer control 3 and passes to recorder control 12 over path 18; as does tape mark information which passes over path 19. The necessary aspects of these latter items pass on to recorder 11 over path 20.

Figure 2:
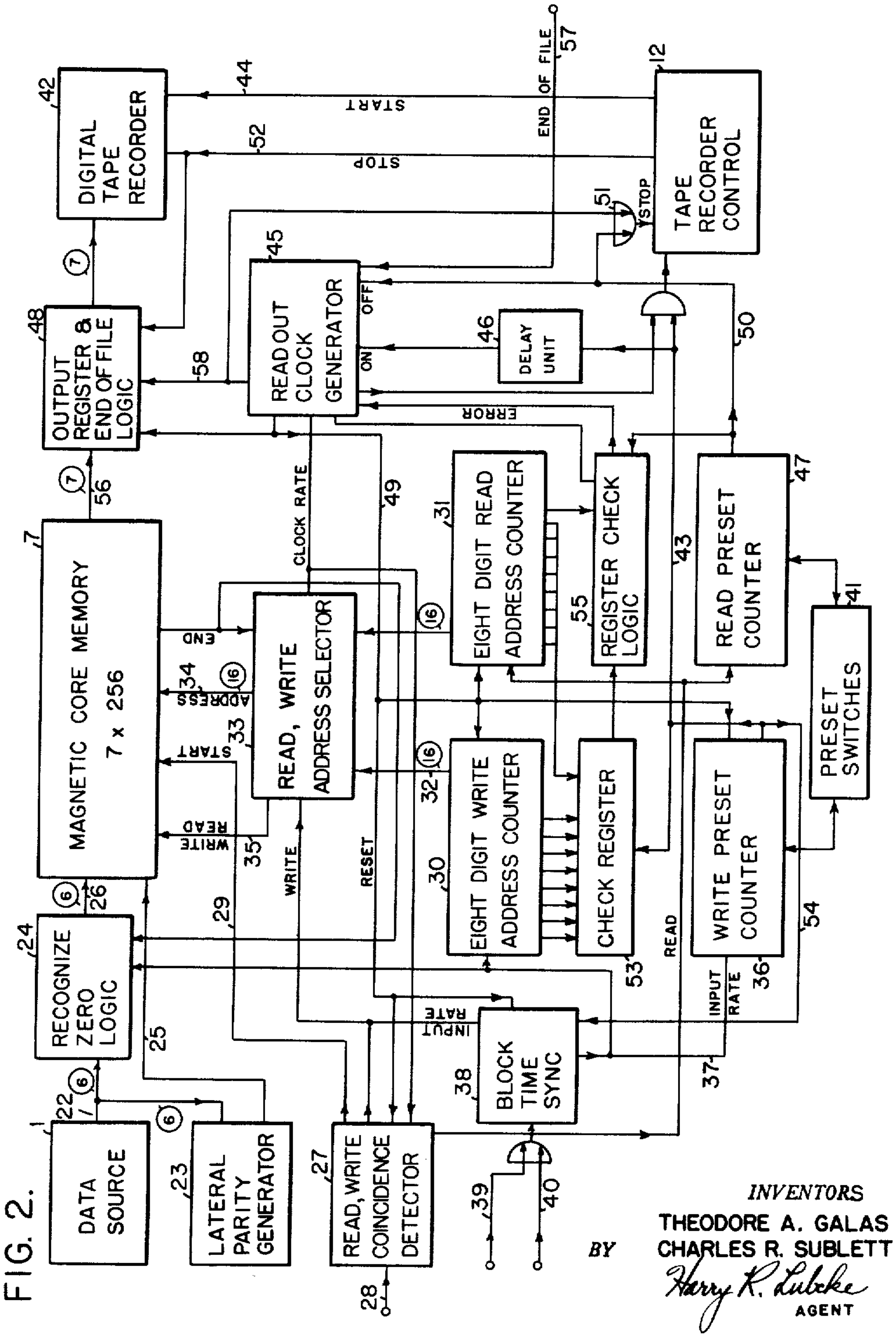
FIG. 2 shows the detailed block diagram of one format control buffer.

We pass now to a more detailed description of our buffer, of the embodiment shown in FIG. 2.

Digital data in, say, binary coded decimal form, originates at digital data source 1, as before, and is conveyed over six parallel lines 22. The latter are represented in FIG. 2 as one line with the circled numeral "6" for simplification and clarity. These data pass to the read-in logic previously mentioned, which here comprise parity generator 23 and recognize zero logic 24. The parity generator is composed of a relatively large number of AND logics interconnected with NOT logics and followed successively by OR logics. A separate lateral parity bit is formed in parallel with the data on the six lines 22 and is conveyed to memory 7 over seventh line 25.

Illustrative of format changes required in our buffer art is the recognize zero logic 24, which converts binary coded decimal zero to binary coded decimal ten for another computer format, such as that of the IBM electronic computers.

Six lines 26 convey the now modified digital data from the logic 24 to memory 7, with the parity information on the seventh, to the write terminals of the memory.

The matrix of memory 7 conveniently has a storage capacity of 7 by 256 for the example shown. The former value is determined by the number of parallel inputs to be accommodated and the latter value as a reasonable compromise between the complexity of memory and circuits and the speed of operation with blocks of data to be formed of usual length.

The memory is arranged to store data during the same time interval that data are read out of the memory. This action, however, may not be simultaneous. Thus, when input information arrives within approximately ten microseconds of a read-out signal the input signal is stored until the read out is completed. The read-out signal takes precedence because the data bit density upon the recording medium must be uniform throughout each block of data. Read, write coincidence detector 27 accomplishes the detection of any coincidences and suitably delays the write data. Detector 27 is composed of a flip-flop interconneced with AND logics followd by OR and NOT logics. It may be actuated by a control input 28, which is obtained from the data source and is a data clock indicating the presence of data on the six data lines 22. Detector 27 exercises start control over memory 7 via connection 29.

The address of memory 7 consists of an eight digit write counter 30 for the example being considered and a corresponding eight digit read counter 31. The input rate of the incoming data drives the write counter and it steps the address from 0 to 255 as the count progresses. This information is conveyed by 16 conductors 32 from write counter 30 to read, write address selector 33. Diode logics in selector 33 select the proper digit position in the memory as the count progresses via 16 conductor cable 34. Write control pulses are also supplied to the memory after each address is selected, via conductor 35. Thus, the six data and the one parity bit corresponding are suitably stored in the memory.

An eight digit write preset counter 36 is also driven by the input rate, which may be random with time. This rate arrives via conductor 37 from block time sync unit 38. This unit, in turn, is controlled from a "time" sync input, which may be from a commutated data reset 39 or a time rate reset 40. This input is uniform with respect to the data. The sync is a pulse that indicates this special data is present and that operation may proceed; proper blocks of data wil be obtained.

Preset counter 36 determines the block length of the modified format data. This may be preset by switches 41, which control counter 36 to arrange blocks limited only in length by the matrix of the memory. Usual block lengths are reasonably less than that length and these may be only a small fraction of that length, if desired. Eacn time the preset counter completes its count tape recorder 42 is started. This is accomplished through conductor 43, recorder control 12 and conductor 44.

After a fixed time interval required to create the blank tape space between each block of data, the readout clock generator 45 is turned on by energy from write preset counter 36, this energy passing through delay unit 46 wherein a 10 millisecond delay is obtained. This initiates the readout, which continues until a block has been recorded. During the time that the recorder is accelerating to proper speed and while it is recording input data continues to arrive. This advances the count on write address counter 30 and refills the write preset counter 36. Thus, data continue to be stored in empty digit positions in memory 7.

The output of the readout clock generator is a 12 kilocycle square waveform. It drives the read address counter 31, which selects, in sequence, the same digit positions of the memory in which data have been stored. Read, write address selector 33 again selects the proper addresses and supplies readout control signals to memory 7 after each address has been selected. Clock generator 45 also drives address counters 30 and 31, to fix the block length.

Both read and write preset counters 36 and 47 are set to the same block length by switches 41, which are ganged as between the counters but which may be set to either of two positions as to binary significance. Counter 47 supplies a pulse when a block of data has been completed. This gates off clock generator 45 and after another delay interval sufficient to produce a gap in the tape record suitable for inserting a longitudinal parity check the recorder stop controls are actuated. The tape record is blank between the end of the block and the longitudinal parity check because read clock generator 45 is gated off. A reset pulse from generator 45 is conveyed to output register and end of file logic 48, in which the flip-flops are reset and the longitudinal parity check is generated. The reset pulse from generator 45 is also conveyed to coincidence detector 27, block time sync 38, write address counter 30, write preset counter 36 and read address counter 31 by conductor 49 and appropriate branch conductors. At the same time, the off pulse originating in read preset counter 47 and reaching clock generator 45 by conductor 50, also passes to recorder control 12 through an OR logic 51 and recorder 42 is deenergized through conductor 52. In slowing down part of the required space between blocks of data is formed, the remainder being formed by the subsequent starting of the recorder. This space is often set for 0.75 of an inch, as for IBM computers.

It is desirable to have the buffer capable of detecting errors caused by transients malfunctioning counters or by other short period electronic failures. Accordingly, in FIG. 2 a check register 53 is provided. This is multiply connected to write address counter 30 and the contents thereof are transferred to the check register when the write counter is full. When the readout process has been completed the state of the flip flops in read address counter 31 is compared with the check register 53, also by multiple connections between the two pieces of apparatus. If this comparison indicates a discrepancy between the counters of write address 30 and read address 31, all counters are reset to zero and a new start is made with further data.

In somewhat more detail the process includes transferring the contents of the 8 digit write address counter 30 to the check register 53 when the output of the 8 digit write preset counter occurs. Check register 53 remains in a static condition until the next transfer from the write address counter 30. In this interval of time the output from the 8 digit read preset counter 47 yields an output which compares the state of check register 53 to the state of the 8 digit read address counter 31 at that instant. Since the comparison is made at the time a full block has been written on tape, the next block, if an error in block count has been indicated, will be destroyed and all counters are reset to start in sync with the next time sync input from the block time sync circuit 38. The check circuit compares all read, write registers 30, 31, 36, 47 one with the other, for determining errors. If desired, a bell or other audible means may be actuated at each error by connecting it to the output of the register check logic.

Time rate signals from data source 1 are fed to block time sync 38. This gates the input rate to the write preset counter 36 and the write address counter 30. When the write preset counter is full a pulse is returned to block time sync via conductor 54, which gates off the input signal. The counters cannot be further actuated until another time sync signal occurs. This insures that the next block of data will commence in synchronism with time information.

Register check logic 55 is composed of AND logics coacting with OR logics. These feed a one shot multivibrator which drives the reset line for the read, write registers 30, 31, 36, 47.

Under the control of the several described devices constituting buffer control 3 in FIG. 1, the seven bit digits comprising the input data and lateral parity check are conveyed from memory 7 to output register 48 over seven parallel conductors 56. In output register 48 seven write amplifiers raise the energy level of these data to magnetic tape recording level for non-return to zero recording on magnetic tape in recorder 42. In this type of recording the scalar magnitude of the recording current is retained constant. The direction of the current is reversed for each binary "one." Binary "zero" is written on the tape by a constant current value, no matter whether this be current in the positive or the negative direction as resulting from the last change for a "one."

When all data of a given file have been processed an end of file signal is impressed upon conductor 57 by manual or input data means. This enters clock generator 45. Tape recorder 42 is started and after an appropriate delay, such as to allow a tape gap length of 3.75 inches for an IBM computer format, an end of file pulse is conveyed to the end of file logic 48 over conductor 58. This prints a unique end of file code on the tape.

Figure 7:
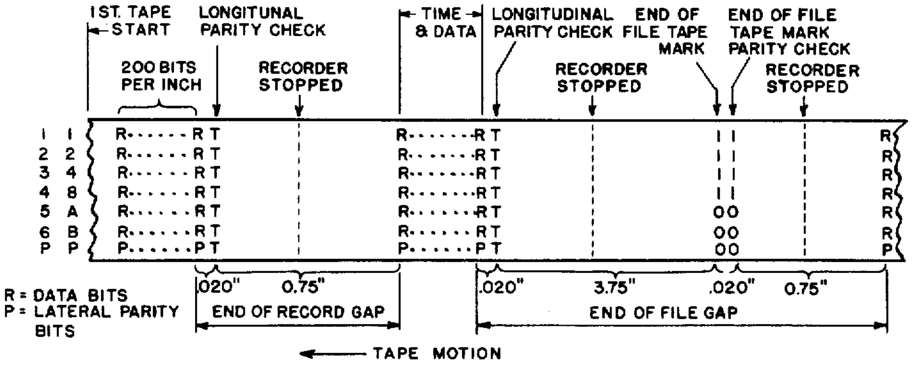
FIG. 7 shows a portion of tape produced at the output of our buffer, indicating how the same is stopped and started to suitably group data thereon.

The end of file pulse also actuates the recorder stop control after a delay permitting a brief gap, such as 0.020 inch, to provide final longitudinal parity check. This check is identical with the end of file mark since the parity check is normally even. The magnetic character of the resulting tape is shown in FIG. 7, where the various bits, checks and spaces are identified.

While our format control buffer may be constituted to produce formats for various known electronic computers, as described above it is particularly suited for operating an IBM 704 computer. With suitable setting of the block length and suitable input rate control data our buffer is also suited to format for the IBM 650 and 774 tape to card tabulator machines.

One embodiment of our invention has been described above and in conjunction with FIGS. 1 and 2. An alternate embodiment is now to be described in conjunction with FIGS. 1 and 3. This embraces a simplified control of the memory and allows alternate operation of two recorders for extended recording of the output of the buffer with an automatic changeover from one recorder to the other.

Figure 3:
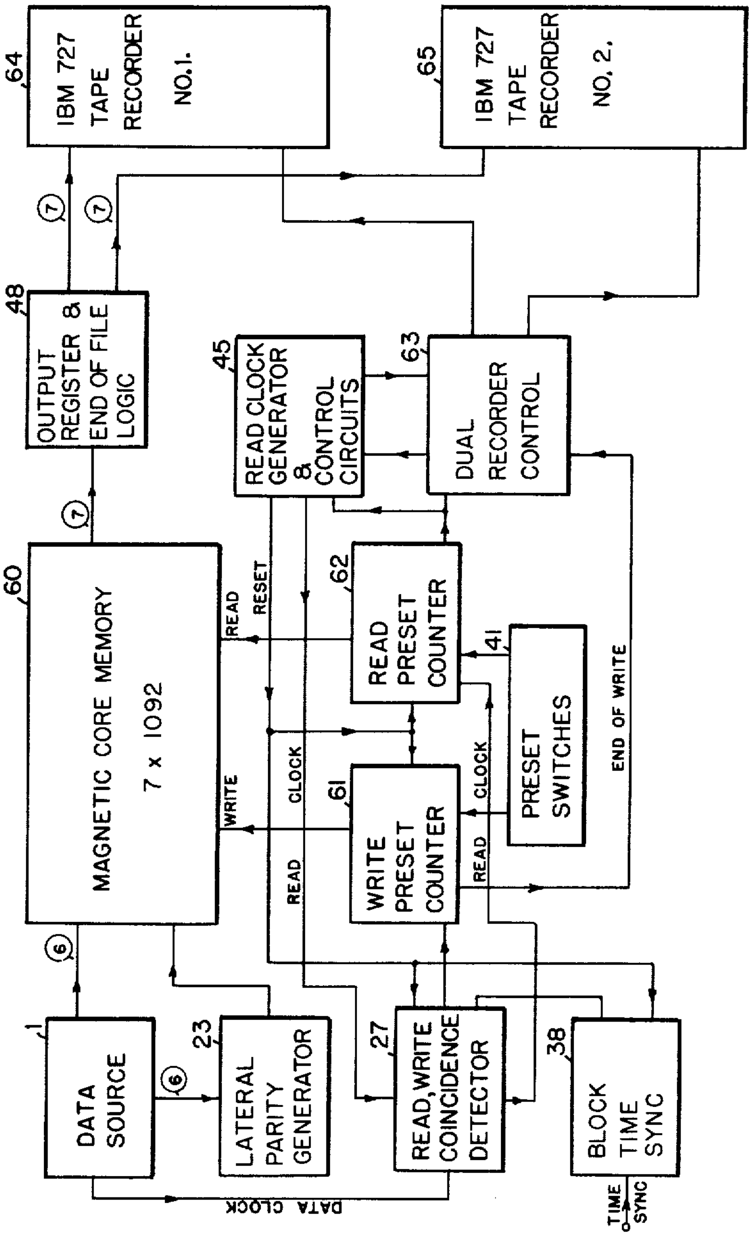
FIG. 3 shows the detailed block diagram of an alternate embodiment of our format control buffer.

In FIG. 3, as before, source 1 provides the originating data, as from a previously recorded tape, a flip-flop register or the output of a computer of format different from that required to be subsequently driven. Similarly, parity generator 23; read, write coincidence detector 27; and block time sync 38 are either identical to the corresponding elements of FIG. 2, or are sufficiently similar so that the use of the same reference numeral is justified.

Memory 60, while of the same general nature of the prior memory in being a rectangular magnetic core matrix, has, for example, a considerably greater number of storage elements; i.e., 7 by 1,092, rather than 7 by 256; and also has an internal "ring" address counter instead of elements 30, 31 and 33 of FIG. 2. This address apparatus takes the form of duplicate throw electronic switch and counter for one dimension of seven 28 by 39 memory matrices and duplicate 39 throw electronic switch and counter for the other dimension. One of each duplicate is for writing and the other for reading. Write preset counter 61 and read preset counter 62 are the equivalents of prior preset counters 30 and 31, respectively. The preset switches 41, giving manual control to the block length, are the same as in FIG. 2.

The read out clock and control circuits 45 and the output register and end of file logic 48 are similarly the equivalent of FIG. 2 and are so numbered. A dual recorder control 63 is similar to its counterpart 12, but since two recorders are controlled and certain "end of tape" notification signals are provided a new identifying number is provided. Likewise, IBM 727 tape recorder No. 1 is employed at 64 and a duplicate at 65 instead of the single Ampex FR 207. These recorders are known to the art and are best identified by the manufacturer's name and type number. It will be understood, of course, that equivalent recorders of other manufacturers exist throughout the world and that these may be substituted.

Figure 4:
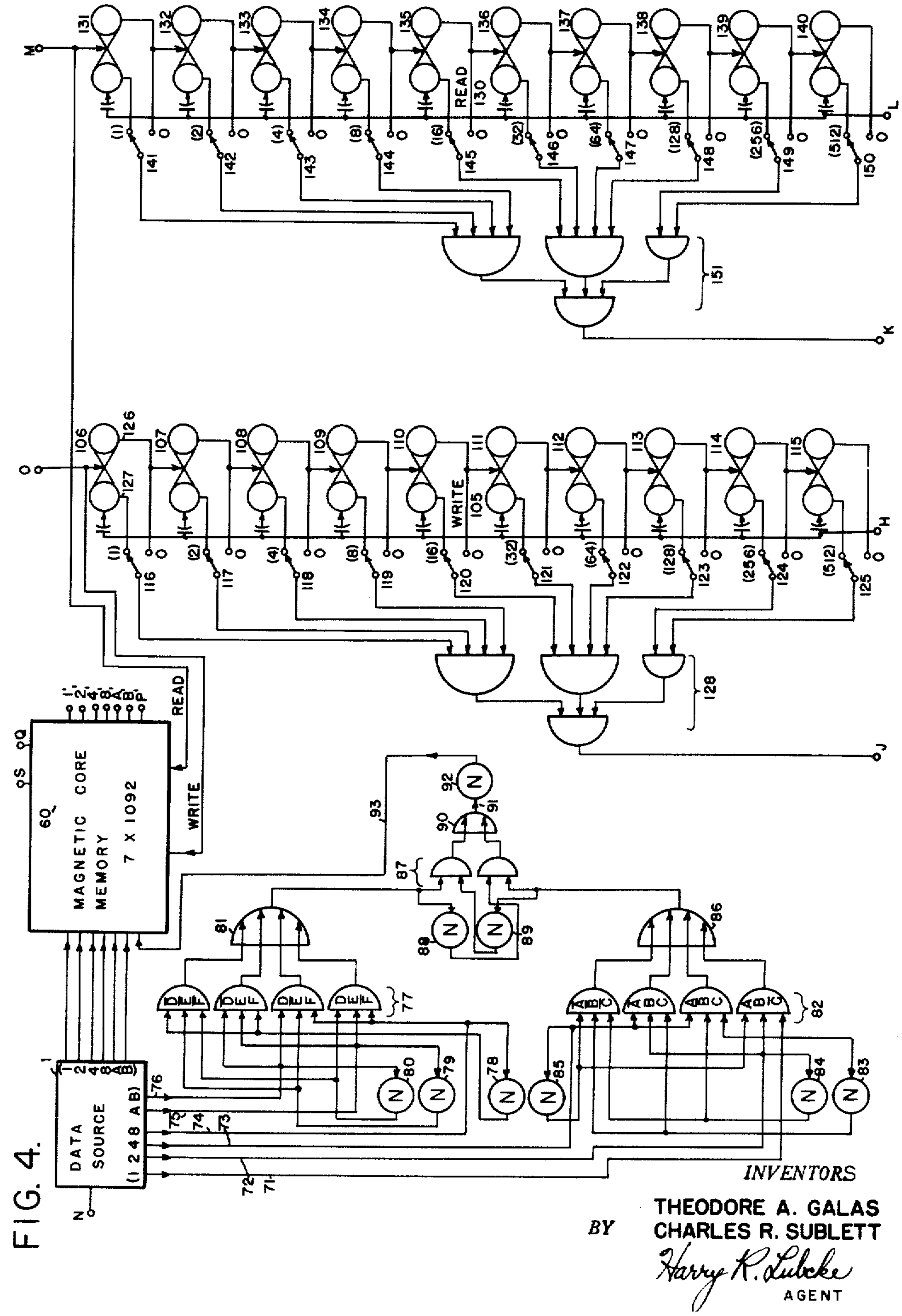
FIGS. 4, 5 and 6 show the schematic diagram of the alternate embodiment of our buffer. The circuit passes from one sheet to the next with matching letters of the alphabet.

The detailed block diagram of FIG. 3 is now further detailed by reference to FIG. 4, a schematic diagram. In FIG. 4, digital data from source 1 enters the buffer over six parallel lines 71, 72, 73, 74, 75 and 76. These lines may carry, for example, the following binary information: 1, 2, 4, 8, A and B, respectively.

The apparatus connected to the lines described composes the parity generator 23 of FIG. 3. Data bits on lines 74, 75 and 76 are applied to four diode logic AND circuits 77 and having the equations: $\bar{D}\ \bar{E}\ \bar{F}$, $\bar{D}$ E F, D $\bar{E}$ F, D E $\bar{F}$. The "not D" (i.e., $\bar{D}$) is provided by element 78. This is basically a phase reversing amplifier and preferably restores pulse shape by regenerative action, having also a cathode follower output. Similarly, the "not E" element is identified by numeral 79 and the "not F" element by 80. The four logic AND circuits 77 are each composed of three diodes with cathodes connected to a negative potential through a common resistor, as is known.

The outputs of the four AND circuits are connected to a four element OR circuit 81. The latter is composed of four diodes with anodes connected to a positive potential through a common resistor, as is also known.

Data bits on lines 71, 72, and 73 are applied to an exactly similar group of circuits; four AND circuits 82, three "not" circuits 83, 84 and 85, and an OR circuit 86.

OR circuit 81 is connected to opposite sides of a further AND circuit 87, directly to one side and through NOT circuit 88 to the other. Similarly, OR circuit 86 is connected to AND circuit 87, directly and through NOT circuit 89. Further, AND circuits 87 are connected to OR circuit 90, the latter having two diode elements. The output of the whole logic is thus combined upon one conductor 91, where it is shaped and phase-reversed by NOT amplifier 92. The output thereof passes via conductor 93, making the seventh input connection to the memory. These logics comprise lateral parity generator 23 of FIG. 3. It produces a binary one for any odd number of ones in the six parallel data channels and a binary zero for an even number of ones therein. By omitting NOT circuit 92 an odd parity may be generated.

The apparatus composing coincidence detector 27 of FIG. 3 is now considered. This circuit is driven by a write clock rate of 15 kilocycles, for example, from read out clock 45 to be later described. A phase-reversed output of the square wave generated by clock 45 is employed. This arranges writing to begin in the memory only after a given read pulse has occurred. This is accomplished by delays effective upon the writing function.

Each section of the square wave referred to has a duration of 66 microseconds. Element 95 in FIG. 5, which is a continuation of the circuit of FIG. 4, is a delay unit effective to delay this waveform 12 microseconds. In detail, this element is composed of an integrating network followed by a regenerative squaring amplifier; i.e., the equivalent of two NOT circuits, previously described, in cascade. After this 12 microseconds delay one shot monostable multivibrator 96 is fired. Capacitor 97 induces a delay in this element. This delay is adjusted, for example, to a period of 40 microseconds by providing a capacitor having 100 micromicrofarads capacitance.

A positive excursion from the above one shot passes to AND gate 98 and closes the same for 50 microseconds. Thus, a write pulse cannot write data into the memory during that time. Read pulses may, however, be read out of the memory during that time. It is necessary that this be the case, since once a block of data is started to be read out of the memory nothing must interrupt the process. This occurs at exactly 15 kilocycles per second and results in a bit density on the recording tape of 200 bits to the inch.

Assuming that a write pulse occurs, it enters AND gate 99 and thence to flip-flop 100, which it triggers, thus storing the pulse. The output of flip-flop 100 connects to the other side of AND gate 98, by means of conductor 101. After the 50 microsecond pulse from one shot 96, gate 98 is opened, and if a write pulse has been stored in flip-flop 100 it then passes through. Having passed through, it triggers subsequent flip-flop 102. The output therefrom goes to delay unit 103, where a delay of the order of 3 microseconds is provided. After such delay flip-flop 100 is reset, insuring that gate 98 will not be opened until another write pulse triggers flip-flop 100. Gate 98 is not closed until 3 microseconds after being opened, thus the write pulse is of 3 microsecond duration. Because of the read pulse delays introduced, the write pulse must occur after the leading edge of a given read pulse. The write pulse enters the memory via cathode follower 104.

The write preset counter is generally indicated by numeral 105. It is composed of ten flip-flops 106 to 115, connected as a register, which is switch controlled by preset switches 116 to 125. The circuit is capable of accumulating any number of pulses from 1 to 1023. The exact number is determined by the positions of the switches. The lower right terminal, as 126, of each flip-flop has the binary value of zero. The left lower output, as 127, has numerical value.

Filp-flops 106 through 115 are binarily connected. These thus form an accumulator register or binary counter circuit. Each flip-flop, starting with 106, divides the incoming pulse rate by two. With ten flip-flops the rate is only 1/1024 at the last one, 115. Block length information is taken from the left hand outputs, as 127, of the ten flip-flops. The actual binary values of the flip-flops in the register are: 1, 2, 4, 8. 16, 32, 64, 128, 256, 512. The sum of these values is 1023, which is the maximum block length in characters.

In operation, after reset, all of the left hand outputs, as 127, in the binary register will be positive and all the right hand outputs, as 126, will be negative. The first write pulse drives output 127 of flip-flop 106 negative. A positive pulse accordingly appears at output 126 of flip-flop 106. This positive pulse has no effect on the second flip-flop 107, since all these circuits are arranged to operate on negative pulses.

The second write pulse applied to flip-flop 106 drives output 127 positive and output 126 negative. The latter output does trigger flip-flop 107 positive at the right hand output, thus the left hand output of flip-flop 107 indicates a count of two.

The positive output of the right hand output of flip-flop 107 has no effect upon flip-flop 108. The third write pulse will not drive flip-flop 107 right hand output negative because a positive pulse is produced at the right hand output 126 of flip-flop 106. Thus, flip-flop 108 will not change until the fourth write pulse has occurred. The left hand output of flip-flop 108 will therefore indicate a count of four.

The sequence of operations of the remaining flip-flops in the binary register is identical to that described above.

When the binary register has accumulated the total number of pulses that have been preselected by the block length switches 41 in FIG. 3, the state of the flip-flops in the register binarily represent the number of pulses accumulated. These determine the block length. An end of write output is generated by sampling the outputs of the flip-flops 106 to 115 by means of diode logic AND circuits 128, FIG. 4. The AND circuit output leaves FIG. 4 at terminal J, reappears at terminal J of FIG. 5, passes through cathode follower 155, delay circuit 260 set for 3 microseconds and OR circuit 152. This signal leaves FIG. 5 at terminal H and returns to FIG. 4 as the reset pulse. This resets all the flip-flops in the write preset counter 106 to 115.

The preset write switches of element 41, FIG. 3, which are switches 116 through 125 and others of FIG. 4, coact with the flip-flops and logic previously mentioned as follows. Each of the ten write switches is capable of independent manual setting in either of two positions. In FIG. 4 the upper position of each corresponds to a number and the lower position to zero. Ten read switches to be later described are mechanically ganged to corresponding write switches so that a single manual operation sets both a write and a read switch to the same relative position.

The upper position of each switch connects to the left hand output of each flip-flop and the lower position to the right hand output. Because outputs are taken from both sides of a given flip-flop, a numerical valued output has the same value, for example, minus 20 volts, as a zero output, assuming that the switch involved has been properly set. Accordingly, if switch 116 is set to position zero and switch 117 is set to its number position, which is two, both switches 116 and 117 will convey negative outputs only when an output is obtained from the right hand output terminal 126 of flip-flop 106 and from the left hand terminal of flip-flop 107 at the same time. This will occur when the register has accumulated two pulses.

The outputs from switches 116 through 125 are applied to the inputs of diode logic AND circuit 128. Only when a negative voltage is obtained from all ten switches can this AND circuit produce an output beyond the second cascade of the circuit shown. Therefore, this ouput is obtained only when the number set by the selector switches is equal to the number of pulses accumulated in the counter.

Counters 131 through 140 comprise the read preset counter 62 in FIG. 3 and switches 141 through 150 the read portion of the preset switches entity in that figure. In conjunction with diode logic AND circuit 151 the action in determining a preset block length is the same as has been described in connection with the write counter and AND logic.

The output of the above preset counters is, of course, used to control the write and read functions of memory 60. This is accomplished through appropriate gating.

Figure 5:
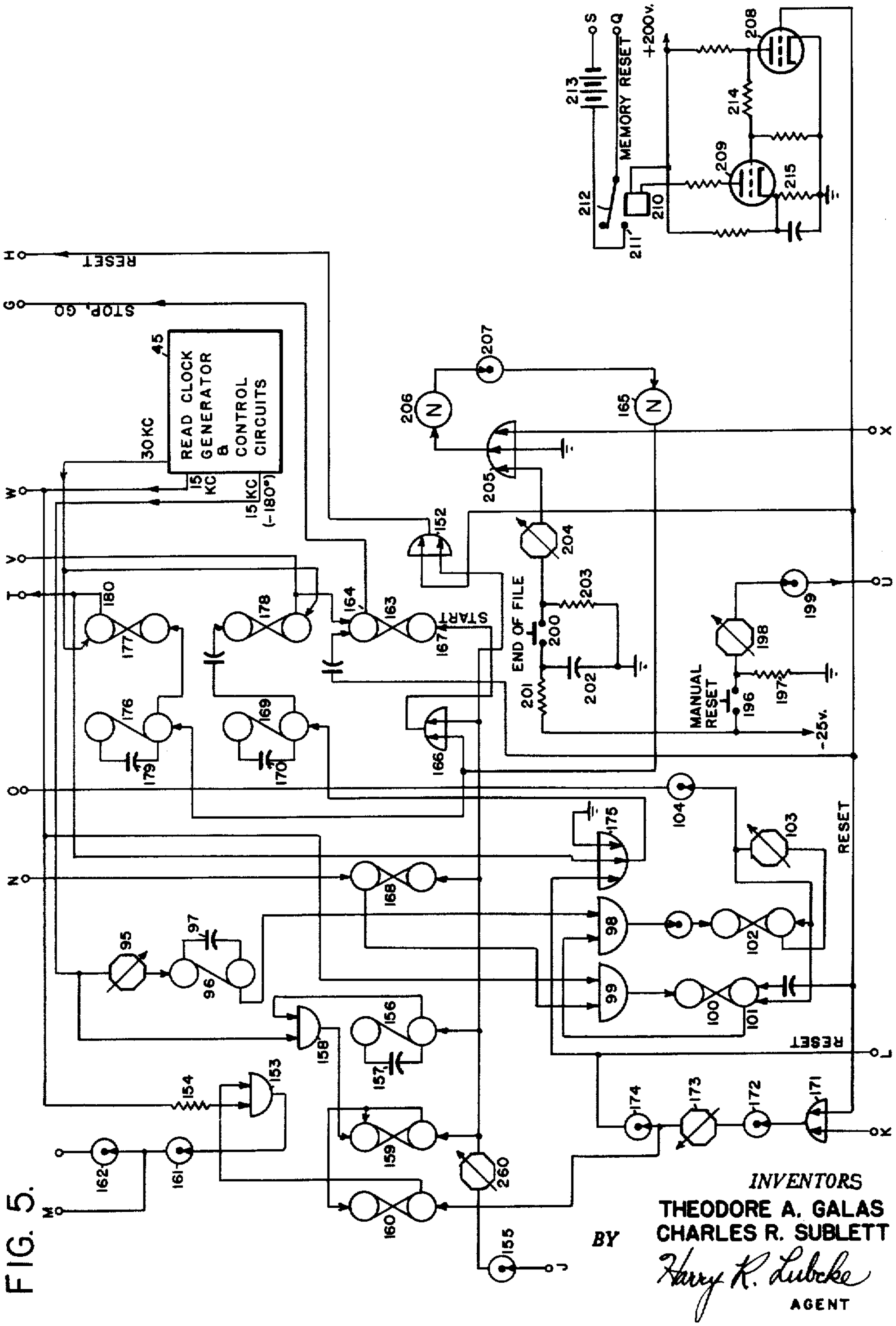

The read pulse gate consists of a diode logic AND gate 153, in FIG. 5. A 15 kilocycle read clock rate from that entity 45, in FIG. 3, being a square wave of amplitude from zero to minus twenty volts in a typical embodiment, is impressed upon one diode of AND gate 153 through resistor 154. This resistor has a resistance of one thousand ohms and matches logic level in order to eliminate logic noise.

The end of block pulse derived from diode AND logic 128 passes from FIG. 4 to FIG. 5 at terminal J, then through cathode follower 155 for impedance adjustment downward and isolation and thence to a 3 microsecond delay element 260 and one shot 156 having a capacitor 157 of the order of 0.05 microfarad to give a time delay of 10 milliseconds. The output of one shot 156 opens one side of AND gate 158 when the one shot is down. The other side of the gate is connected to the 15 kilocycle minus 180 degree phase clock output previously mentioned in discussing delay unit 95 and one shot 96. Accordingly, 10 milliseconds after the end of write block gate 158 passes a clock pulse to flip-flop 159. This being operated thereby passes the output of gate 158 through 159 to operate flip-flop 160. The output of the latter opens read gate 153 by applying a negative pulse thereto. Thus, reading out of a block of data stored in the memory begins. Through cathode follower 161 the read 15 kilocycle minus 180 degree clock output is applied to the trigger connection of read counter flip-flop 131 (FIG. 4), to initiate the block count thereof, as has been described.

The output from cathode follower 161 also drives a second cathode follower 162 which drives a tape recorder control to be later described.

It has previously been mentioned that the tape recorder is started when a block of data has been accumulated in the memory and stopped after this has been recorded. These operations are controlled by elements now to be described.

Flip-flop 163 (FIG. 5) starts the recorder upon receiving end of file information or end of write block pulses. Upon receiving a 0.020 inch tape gap or longitudinal parity signal flip-flop 163 stops the recorder.

When a reset pulse is produced by manual operation of the Reset button 196, which is a part of the tape recorder control 63, the output at conductor 164 of FIG. 5 is zero. Manual or automatic end of file information from the tape recorder control is applied through amplifier 164 to an OR circuit of diode logic 166. The end of write block pulse from cathode follower 155 through delay element 260 is impressed upon the other side of the OR gate 166. Thus, either of these completion actions will produce an output from this gate. This output reaches the start terminal 167 of flip-flop 163, which has previously been described. The tape recorder remains in motion under the control of flip-flop 163 until an end of read pulse from counter 130 (FIG. 4) causes one shot 169 to trigger, thus giving a delay fully sufficient to generate a 0.020 inch tape gap and allow flip-flop 178 to pass a clock pulse. This causes control flip-flop to trigger to its opposite state, thus stopping the motion of the tape.

The 0.020 inch tape gap generator is a one shot delay unit 169 having a 470 micromicrofarad capacitor 170 to form a delay of 268 microseconds. This delay period is equal to 0.020 inch of tape travel at the usual tape travel of 75 inches per second. One shot 169 is fired by either end of read information obtained from diode AND logic 151, FIG. 4, and through terminal K to FIG. 5, through OR gate 171, cathode follower 172, 10 microsecond delay unit 173, cathode follower 174, and OR gate 175; or from the end of file 3½ inch tape gap generator 176, which operates through tape mark flip-flop 177 and the remaining active side of OR gate 175. A 0.020 inch gap is thus obtained at each end of read block and at each end of file.

The negative trailing edge of the 268 microsecond pulse from one shot 169 triggers flip-flop 178, producing a relatively short pulse having a duration much shorter than the 268 microsecond pulse that serves to initiate it. Upon the occurrence of the short pulse the tape recorder is stopped. This output is also used to generate longitudinal parity in tape control apparatus to be later described.

From the manual or automatic end of file amplifier 165 the 3½ inch generator 176 is also triggered. This generator is a 46 millisecond delay one shot employing a 0.1 microfarad capacitor 179 to provide that delay. This period of time allows a 3½ inch length of tape to pass by the recording head without a flux change; i.e., the tape remains "blank." Flip-flop 177 fires on the negative trailing edge of the 46 millisecond delay pulse and provides a much shorter pulse, as in the range from 1 to 33 microseconds' duration. This is known as a tape mark pulse and is available at conductor 180. Flip-flops 177 and 178 are reset by a 30 kilocycle clock rate pulse of negative polarity. This completes the trailing edge of the 1 to 33 microsecond pulses mentioned.

The nature and operation of memory 60 has already been treated in some detail. In further explanation, each time a write pulse is impressed upon the memory during a given block of data a new character having six data bits and one lateral parity bit, as impressed over the seven parallel line inputs, is written. Data that are stored in one column of cores is transferred to the next subsequent column by the write pulse or by the read pulse repetition frequency. A particular seven-bit character is thus moved from column to column until a complete block of data has been written into the memory. When the complete block has been assembled, and this may be at various rates with even intervals of no data incoming during the assembly of data for one block, or at various rates from block to block, the data are read out.

During readout another block of data may, and usually does, begin to accumulate. Between each block length of data in a given file sequence there are a number of unoccupied columns in the memory, depending upon the write pulse rate and the preset block length.

Data are read from the memory at a 15 kilocycle rate in the embodiments coactive with the IBM computers. As soon as a data block has been accumulated the end of write block pulse formed by one shot delay 156, flip-flop 159, etc. opens gate 153 and allows readout pulses to pass through cathode followers 161 and 162 to reach memory 60. A block is then read out. As a particular memory position is vacated it is made available for subsequent write information.

The clock generator per se does not require detailed description. It is represented as entity 45 and consists of a piezo crystal oscillator operating at, say, 240 kilocycles and flip-flop frequency dividers of the same type as employed in preset write counter 105 to provide square-wave outputs of submultiple frequencies to one-sixteenth; i.e., to 15 kilocycles. The 15 and 30 kilocycle outputs are most widely used throughout device, the former at two opposed phases for different purposes. The 30 kilocycle output is used principally as a short duration spike pulse, having an overall duration of 0.6 microsecond and a negative amplitude of 30 volts. The spike pulse is taken from a blocking oscillator driven by the 30 kilocycle flip-flop in the clock generator frequency reducing chain.

It will be appreciated that the exact composition of the output circuits of our format control buffer now to be described will depend upon the type of tape recorder to be driven and the type of computer to be subsequently operated from the resulting tape. In a perferred embodiment the former consists of two IBM 727 tape recorder units and the computer an IBM 704 or 650. From our teaching, however, it will be understood that our buffer may coact with other recorders and computers.

Figure 6:
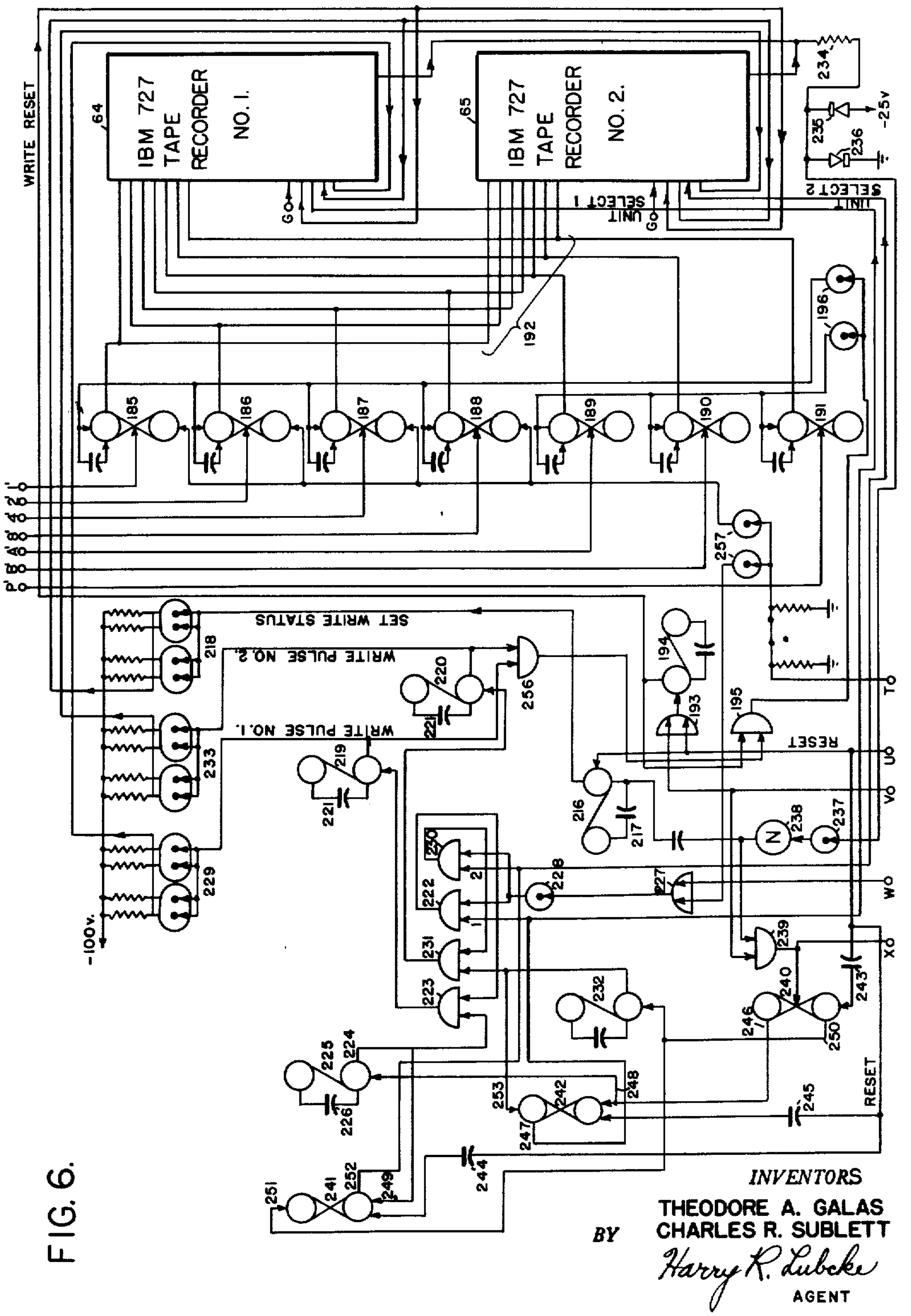

The output register 48 of FIG. 3 is detailed in FIG. 6 as seven flip-flops 185 through 191. Information from memory 60 is impressed upon the binary input of a flip-flop in each case; data line 1' being connected to flip-flop 185 and so on in order to the lateral parity bit line P', which is connected to flip-flop 191. An incoming pulse over any of these lines will thus cause the flip-flop connected to it to change its state. A binary one is represented by a pulse and a binary zero by the absence of a pulse. This output register is reset after each data transfer to the input register within the IBM 727 tape recorder, therefore, a binary one is represented on any one of output data lines 192 by minus 20 volts and binary zero by 0 volts.

A characteristic of the IBM 727 recorder input register enables longitudinal parity to be generated. At the end of each block of data a pulse from our buffer resets the IBM register. If a binary one output is present on any output line this is reset to zero, thus the change registers a "one" at the time of the 0.020 inch gap on the recording tape, which gap has been previously described. If the state of any flip-flop is to give an output of zero at this time, the reset pulse does not change the state and the parity bit is zero for that output line. It is to be noted that the flip-flops within the IBM 727 recorder input register are triggered to the opposite state for every input pulse, while the output register in our buffer (185 through 191) is reset after each input pulse received on data lines.

The reset pulse for our buffer originates at either pulse shaper 219 or 220, passes through AND logic 256, through AND logic 195 and twin cathode followers 196, each of which connects to approximately half of the register flip-flops 185 to 191 in order to halve the capacitative loading.

In addition to being reset by the above-described reset pulse, the flip-flops 185 through 191 may be manually reset. This involves pressing manual reset switch 196, which is connected to a minus 25 volt D.C. source and through resistor 197, of 15,000 ohms, to ground. Closing the momentary contact type reset switch produces a negative pulse in the circuit. This is delayed 5 microseconds to reject transient pulses by delay unit 198, passes through cathode follower 199, from FIG. 5 to FIG. 6 via terminal U and thence to the other OR side of diode logic 193.

Output register flip-flop 185 through 188 (four only of the whole register) are set by either the manual or automatic end of file devices. The manual device is composed of a momentary contact type switch 200 connected to the junction of a resistor 201 of 100,000 ohms resistance and a capacitor 202 of a tenth microfarad capacitance. A second resistor 203 ties the otherwise floating end of a 5 microsecond delay unit 204 through a desirable impedance to ground. A negative pulse is also obtained by actuating this switch. This passes through OR gate 205, through shaping amplifier 206, cathode follower 207, additional shaping amplifier 165, through 3½ inch gap generator 176, 177, via terminal T from FIG. 5 to FIG. 6, through cathode follower 257 and to the four flip-flops above identified in the output register.

This arrangement gives the binary number 1111000. The three remaining flip-flops are set to zero at the same time as has been described. This number is recognized as a logical end of file by the IBM equipment.

The magnetic cores in memory 60 are also reset by the pulse originated by manual reset switch 196. The minus 20 volts pulse from the switch greatly reduces the current flowing through vacuum tube 208 by making the grid thereof more negative. This increases the potential on the grid of vacuum tube 209 by 21 volts (in a typical embodiment) and causes the plate current of that tube to greatly increase. This closes relay 210. Relay contacts 211 and 212 connect a source of current from a power supply, or the equivalent battery 213, which passes through all cores and resets the magnetic saturation of each to the polarity corresponding to binary zero. The relay actuating amplifier described is direct coupled. Resistor 214, of 400,000 ohms resistance, is the interstage coupling resistor, with cathode bias resistor 215, of 8,000 ohms resistance limiting the current in the second vacuum tube to a safe and desirable value.

The IBM 727 tape recorders require pulses to set write status and to write, in order that data from the output register lines 192 shall be recorded when impressed upon these recorders.

The set write status pulse generator 216 is a one shot unit imposing a delay of 5 microseconds upon the reset pulse previously described. A 33 micromicrofarad capacitor 217 accomplishes this delay. The delayed and also rectangularly shaped pulse provided out of generator 216 is conveyed through a multiple cathode follower 218, embracing, say, four tubes connected in parallel to raise the power level suitably to drive the IBM 727 recorders. These tubes may have four cathode resistors, each of a few thousand ohms resistance and two watt power rating, the supply side of which are connected to a minus 100 volts power source.

Two write pulse generators are provided, 219 for IBM recorder No. 1 and 220 for No. 2. These are similar one shot multivibrators, each providing a 25 microsecond rectangular pulse of minus 30 to plus 10 volt peak output, and having a 68 micromicrofarad capacitor each, 221, to provide this duration.

Generator 219 is triggered at the 15 kilocycle read pulse rate when this pulse repetition frequency is gated through AND gate 256 by the unit select signal No. 1 and through AND circuit gate 223 by the negative potential at terminal 224 of one shot 225. The latter has a 0.1 microfarad capacitor 226 to provide a 60 millisecond positive pulse at end of file. When this pulse occurs gate 223 closes; i.e., at end of file. At all other times the negative resting potential of one shot 225 keeps gate 223 open.

The 15 kilocycle read pulses pass through OR gate 227, through cathode follower 228 and appear at the right hand side of AND gate 222, from there to pass through the right hand side of AND gate 223 and thence to drive pulse generator 219. Multiple cathode follower 229 is connected to generator 219 to drive the IBM recorder; follower 229 being the same as follower 218 previously described.

In the same manner as above described, write pulse generator 220 is triggred at the 15 kilocycle read pulse rate when this is gated through AND gate 230 by unit select signal No. 2 and through AND gate 231 by a negative potential from one shot 232. The 15 kilocycle pulses pass through OR gate 227, follower 228, the right side of AND gate 230, the right side of AND gate 231, and to generator 220. Multiple cathode follower 233 performs the same IBM driving function as did followers 218 and 229.

Write reset pulse generator 194 resets the write registers in the IBM 727 tape recorder by providing a 10 microsecond pulse having an amplitude of from minus 30 to plus 10 volts. The 0.020 inch tape gap pulse that activates the longitudinal parity operation also triggers generator 194. The IBM register is cleared on the trailing edge of the 10 microsecond pulse from pulse generator 194.

An automatic end of file operation occurs when a tape indicator signal is received from the tape of the IBM 727 tape recorder in motion. This takes place when the tape is soon to run out, at the end of a reel. This signal passes through resistor 234, having a resistance of 22,000 ohms, after which levels are set by diodes 235, 236. The signal then passes through cathode follower 237, through shaping amplifier 238 and down the right hand side of AND gate 239. This allows the next 0.020 inch gap pulse to pass through the left hand side of AND gate 239. This constitutes an automatic end of file pulse, passing through OR gate 205 of FIG. 5 via terminal X from FIG. 6, amplifier 206 and cathode follower 207. The automatic end of file pulse is also applied to the binary input of flip-flop 240. Consequently, whenever this pulse occurs this flip-flop must change state.

Which tape recorder is selected to operate is determined by a sequence initiated by the manual Reset, the operation of which selects unit No. 1. When the tape on this unit has been filled with recorded data, unit No. 2 starts to operate, and so on, back and forth, the tape on the idle machine being replaced by a new reel by an operator as required.

When manual Reset button 196 is pressed, the resulting pulse is applied through cathode follower 199 and terminal U from FIG. 5 to FIG. 6 to flip-flops 240, 241 and 242. This application to the flip-flops is through capacitors 243, 244 and 245, respectively, the capacitance of the first two being 47 micromicrofarads and the latter 15 micromicrofarads. This reset causes output 246 of flip-flop 240 and output 247 of flip-flop 242 to be in the high state, i.e., zero volts, while output 252 of flip-flop 241 is in the low state, i.e., minus 20 volts. Flip-flop 240 is the unit select control flip-flop. However, because of the output at terminal 252 of terminal flip-flop 241 and at terminal 247 of flip-flop 242 it is certain that an output shall be obtained to enable only recorder unit No. 1 to operate. This is the unit select No. 1 signal and is applied to unit No. 1 from AND gate 222.

The above sequence of operations having taken place, particularly as to flip-flop 240, the first end of tape signal from recorder unit No. 1, passing through inverter amplifier 238, allows the next following 0.020 inch pulse to pass through AND gate 239 and to trigger flip-flop 240 to the opposite state so that a negative pulse is now obtained at terminal 250 thereof.

The negative excursion at control terminal 250 causes one shot 232 to trigger and also sets flip-flop 241 in the condition whereby AND gate 230 is open. One shot 232, after being triggered, closes AND gate 231 for approximately 60 milliseconds. During this period the end of file pulse from terminal 180 of flip-flop 177 of FIG. 5 through terminals T to FIG. 6, then through cathode follower 257 and OR gate 227 and cathode follower 228 provides the input to AND gates 222 and 230. The output of AND gate 222 passes through AND gate 223 to fire pulse shaper 219, causing the end of file to be written on the tape of unit No. 1.

The output of AND gate 230 passes to AND gate 231. The latter is closed because of the signal from one shot 232. After the 60 millisecond period of one shot 232 AND gate 231 is on, ready for the next group of write pulses to trigger pulse shaper 220. At the same time flip-flop 242 is reset, closing AND gate 222 and preventing further operation of recorder unit No. 1 for this cycle of events.

At the next automatic end of file, when the tape indicator signal on recorder No. 2 occurs, indicating that this unit is nearing full tape capacity, recorder No. 1 is again placed in motion. At this time a 60 millisecond pulse from one shot 225 turns off flip-flop 241 and thereby causes the No. 2 recorder unit to cease operation 60 milliseconds after the recorder No. 1 has been placed in operation.

FIG. 7 shows the magnetic tape resulting from the processing of data by our format control buffer. This tape is normally of half inch width. The binary coding of the 6 parallel data channels and the lateral parity are shown at the left. The various "R" (and dots) represent bits of data. Correspondingly, "P" represents lateral parity bits. At 0.020 inch after each block, executed at 200 bits to the inch, the longitudinal parity check bits "T" are shown. After this the tape recorder is stopped to allow further data to accumulate in the memory (60 of FIG. 3). The recorder is subsequently started and exactly 0.75 inch after the longitudinal parity check the second block of data is recorded. When this has been accomplished a second longitudinal parity check is recorded and the recorder again stopped. In FIG. 7 it is assumed that this block completes the file of data and hence a 3.75 inch end of file gap is required. Such a gap is provided by circuits that have been described. After that an end of file mark is made, being the characteristic 1111000 binary mark for IBM equipment. A longitudinal parity check also follows.

The recorder is again stopped and the required 0.75 inch gap left between blocks. Upon the memory again filling and the read data signals passed the recorder is again started and the next block (of a new file) started. This is shown at the extreme right of the figure.

It will be noted that symbolic notation has been employed in the interests of clarity of presentation for various computer elements, such as flip-flops, one shots, cathode followers and diode logic gates. The specific schematic diagrams of these elements are well known. The flip-flops are characteristically the Eccles-Jordan triggered bistable multivibrator circuits. The one shot is an equally well known monostable multivibrator. The cathode follower provides a high impedance input and a low impedance output by having a load resistor in the cathode to ground circuit. Diode logic gates of the OR type consist of a plurality of diodes with anodes connected through a common load resistor to a positive voltage or, for instance, to ground. A negative voltage pulse upon any of the cathodes of the diodes passes through. Diode logic gates of the AND type consist of a plurality of diodes with cathodes connected through a common load resistor to a negative source of voltage. A pulse upon one of the plurality of anode inputs will not be sufficient to alter the output voltage across the load resistor, a pulse upon all of the plurality involved is required to cause an output pulse.

According to a similar convention, power sources are merely indicated as a plus or minus sign with a number approximating the supply voltage thereat. This may be supplied by a battery, or in practice by a regulated power supply. Similarly, vacuum tube heaters have not been shown.

It is also possible that neon indicator lights be provided with neon driver vacuum tubes and necessary diode logics to indicate the status of various parts of the buffer circuitry. Since such indicators are not essential to the functioning of the device they have been omitted for brevity.

It will be noted that the buffer of FIG. 2 employs but one tape recorder, while that of FIGS. 3 and 4, 5 and 6 employs two, with provision for automatic changeover. The schematic for FIG. 2 is a duplicate of that of FIGS. 4, 5 and 6, save that the duplication of write controls, entities 219, etc. and 220, etc., and the unit select circuits, entities 240, 241, 242, etc., are not required and are omitted. Also, write address counter 30 and read address counter 31 in FIG. 2 are duplicates of preset counters 36 and 47 of that figure, except that the former are cyclic counters and not preset counters like the latter. The elemental structure of all the counters is the same, but the cyclic counters always count to completion whereas the preset counters may be set to numbers less than a full count.

While the Eccles-Jordan multivibrator circuit is widely used as the so-called flip-flop and the monostable multivibrator as the one shot, other relaxation circuits may be employed instead. That is, circuits having large positive feedback which operate in abrupt transitions between two blocked end states.

Digital data have been mentioned extensively herein. Other data may be processed by our buffer as long as it has the general appearance of the recorded data of FIG. 7. No particular significance attaches to the digital value of the several longitudinal rows with respect to the digital value and the manipulations of our device. Also, although the production of lateral and longitudinal parity checks by our device have been explained in detail, these checks are subject to wide variation as related to the data without affecting the essential manipulations of our apparatus.

It will be appreciated that our buffer is capable of accumulating data at various rates and with or without random wait intervals between successive datums. Consequently, it is fully suited to accept data from more than one data source, either by plural or alternate connection of such sources to the buffer.

In numerous instances exact values of resistors, capacitors and other circuit elements have been given, as have specific frequencies and waveshapes. These have been from particular practical embodiments. In other embodiments it is to be understood that considerable variation may be taken from the values given without obtaining functioning foreign to our invention.

Similarly, in the matter of formats, that format characteristic of a well-known manufacturer has been used by way of illustration. Formats considerably different, omitting parity or other bits, or including new bits come within our invention. Furthermore, recording of the revised format may be accomplished on endless magnetic tape, on tape of various widths and composition, on other magnetic media, on photographic media, punched paper tape and so on.

Still other modifications in the arrangement of the circuits, details of circuit connections, and alteration of the coactive relation between the elements may be taken without departing from the scope of our invention.

Having thus fully described our invention and the manner in which it is to be practiced, we claim:

1. An electronic buffer for accepting electrically represented data over a plurality of channels at various rates, grouping said data into blocks, inserting check bits and recording said data and bits at a density suitable for processing by an electronic computer, comprising; means to impress said data successively upon AND logics and OR logics to form said check bits; an addressable memory, a greater-than-said-plurality of channels of counter flip-flops connected to said memory, means connected to each of said flip-flops to write said data in predetermined blocks into said memory; a further greater-than-said-plurality of flip-flops and means connected to said flip-flops equivalently connected for reading said data from said memory; greater than said plurality of AND logics connected to each group of said flip-flops to determine when said flip-flops have counted said predetermined blocks; a read clock to uniformly time data read from said memory; delayed means connected to said read clock, and an AND gate, means to store a write pulse, said delayed means and said means to store connected to said AND gate to allow said write pulse to enter said memory only when said data are not being read out of said memory; an OR gate, other flip-flop means connected to said OR gate, said OR gate and said other flip-flop means coactive to produce a start pulse when a said predetermined block of data have been accumulated in said memory and to produce a stop pulse after said predetermined block of data has been read out of said memory; data recording means; means to connect said OR gate and said other flip-flop means to said data recording means for the start and stop control thereof; an OR gate additional, plural relaxation means, said OR gate additional and said plural relaxation means connected to said recording means to produce a small gap after each said predetermined block of data has been recorded; a third OR gate and second plural relaxation means combination similarly connected to produce a large gap after each file of plural said predetermined blocks of data have been recorded; and output driving means having a said plurality of flip-flop means to accept said data from said memory and to impress said data upon said recording means for recording thereof.

2. An electronic format control buffer for simultaneously accepting electrically represented digital data over a plurality of channels at various rates, grouping said data into uniform blocks of digits, inserting parity check bits and recording said digits and bits at a fixed density suitable for continuous processing by an electronic computer, comprising; means to impress said digital data and phase reversed said digital data successively upon AND logics, OR logics, AND logics and OR logics to form said parity check bits; an addressable magnetic core matrix memory, a greater than said plurality of channels of counter-connected flip-flops connected to said memory, a switch connected to each said flip-flop to allow preset counter operation thereof for writing said data in predetermined blocks into said memory; a duplicate greater-than-said-plurality-of-channels-of-flip-flops and switches equivalently connected for reading said digital data from said memory; a greater than said plurality of channels of AND logics connected to each group of said switches to determine when said flip-flops have counted said predetermined blocks; oscillatory and frequency dividing means constituting a read clock to uniformly time data read from said memory; a delayed one shot connected to said read clock, an AND gate, a flip-flop to store a write pulse, said delayed one shot and said flip-flop connected to said AND gate to allow said write pulse to enter said memory only when said digital data are not being read out of said memory; an OR gate, a second flip-flop, another flip-flop connected to said OR gate and to said second flip-flop, said OR gate, said second flip-flop and said other flip-flop coactive to produce a start pulse when a said predetermined block of data has been accumulated in said memory and to produce a stop pulse after a said predetermined block of data has been read out of said memory; a magnetic tape recorder; means to connect said OR gate, said second flip-flop and said other flip-flop to said data recorder for the start and stop control thereof; a second OR gate, a one shot and a third flip-flop, said second OR gate, said one shot and said third flip-flop connected to said data recorder to produce a small blank gap after each said predetermined block of data has been recorded;

a third OR gate, second one shot and fourth flip-flop similarly connected to produce a large blank gap after each file of plural said predetermined blocks of data have been recorded; and an output register having a said plurality of flip-flops adapted to accept said data from said memory and to impress said data upon said data recorder for recording thereof.

3. A format control buffer for simultaneously accepting data over a plurality of inputs at a wide range of rates, grouping said data into predetermined blocks of digits, inserting plural parity check bits and recording said data and bits on tape at a fixed bit density suitable for continuous processing by an electronic computer, comprising; a magnetic memory, plural means for impressing said data upon said memory, a parity generator, said parity generator connected to said memory and to said plural means for impressing parity bits upon said memory, a read write address selector, a write counter, a read counter, said counters connected to said address selector and said address selector connected to said memory for the control thereof, a read write coincidence detector, said detector connected to said address selector and to said memory, a block timer connected to said detector; said address selector, counters, said detector and said timer coactive to read out said data and parity bits in predetermined blocks from said memory; an output register, a read out clock, said memory connected to said register and said clock connected to said register and to said detector for timing the functions thereof; a tape recorder, said recorder connected to said register for recording said data and bits at said fixed bit density and said recorder connected to said block timer and said clock to be intermittently progressed to record said data and said bits in blocks upon said tape recorder tape suitable for subsequent continuous processing by an electronic computer by uniformly progressing said tape.

4. An electronic format control buffer for simultaneously accepting electrically represented digital data over a plurality of inputs at intermittent or continuous rates, grouping said data into uniform blocks of digits, inserting plural kinds of parity check bits and recording said data and bits on tape at a fixed bit density suitable for continuous processing by an electronic computer, comprising; an addressable magnetic core matrix memory, plural means for simultaneously impressing said digital data upon said memory, a parity generator, said parity generator connected to said memory and to said plural means for impressing parity bits upon said memory, a read write address selector, a write address counter, a read address counter, said address counters connected to said address selector and said address selector connected to said memory for the control of said memory, a read write coincidence detector, said detector connected to said address selector and to said memory, a block timer connected to said detector; said address selector, address counters, said detector and said timer coactive to read out said digital data and parity bits in blocks of predetermined length at a predetermined rate from said memory; an output register, a read out clock, said memory connected to said register and said clock connected to said register and to said detector for timing the functions thereof; a magnetic tape recorder, said recorder connected to said register for recording said digital data and bits at said fixed bit density at said predetermined rate and said recorder connected to said block timer and said clock to be started and stopped thereby to position said data and bits in blocks upon said tape suitable for subsequent continuous processing by an electronic computer when reproduced by said tape progressed at a uniform rate.

5. Apparatus for grouping data into uniform blocks, and recording said data for continuous processing by a computer, comprising; a memory, first register means connected to said memory, a second register means connected to said first register means, preset means connected to said second register means, to write said data in predetermined blocks into said memory in coaction with said first register means; a duplicate said first register means and a duplicate said second register means and said preset means equivalently connected for reading said data from said memory; check register means connected to said first register means to detect error in counting by said register means; check register logic means connected to said check register means to discard said data erroneously counted; timing means to uniformly time data read from said memory; relaxation means connected to said timing means, gating means, said relaxation means and said gating means connected to allow said data to enter said memory only when other said data are not being read out of said memory; further relaxation means and further gating means coactive when a said predetermined block of data has been accumulated in said memory and coactive after a said predetermined block of data has been read out of said memory; data recording means; said further relaxation means and said further gating means connected to said recording means for the control thereof; still further relaxation means and still further gating means, said still further relaxation means and said still further gating means connected to said recording means to produce a gap after each said predetermined block of data has been recorded; an even still further relaxation means and even still further gating means combination similarly connected to produce a larger gap after each file of plural said predetermined blocks of data have been recorded; and output means to accept said data from said memory and to impress said data upon said data recording means for recording thereof.

6. An electronic buffer for accepting electrically represented data over a plurality of channels at various rates, grouping said data into blocks, inserting check bits and recording said data and bits at a density suitable for processing by an electronic computer, comprising; means to impress said data successively upon AND logics and OR logics to form said check bits; an addressable matrix memory, greater than said plurality of counter flip-flop means connected to said memory, a second greater than said plurality of counter flip-flop means connected to said first greater plurality, means connected to said flip-flop means of said second greater plurality to write said data in predetermined blocks into said memory in coaction with said first greater plurality, a duplicate said first greater plurality of flip-flop means and a duplicate said second greater plurality of flip-flop means and said means connected to said flip-flop means equivalently connected for reading said data from said memory; a check register of counter flip-flop means connected to said first greater plurality to detect error in counting of said flip-flop means; check register logics connected to said check register to discard said data erroneously counted; a read clock to time said data read from said memory at one rate; delayed means connected to said read clock, an AND gate, means to store a write pulse, said delayed means and said means to store connected to said AND gate to allow said write pulse to enter said memory only when said data are not being read out of said memory; an OR gate, other flip-flop means, said other flip-flop means connected to said OR gate, said OR gate and said other flip-flop means coactive to produce a start pulse when a said predetermined block of data has been accumulated in said memory and to produce a stop pulse after said predetermined block of data has been read out of said memory; data recording means; said OR gate and said other flip-flop means connected to said data recording means for the control thereof; a second OR gate, plural relaxation means, said second OR gate and said plural relaxation means connected to said recording means to produce a small gap after each said predetermined block of data has been recorded; a third OR gate and second plural relaxation means in combination similarly connected to produce a large gap after each file of plural predetermined blocks of data have been recorded; and an output driving means having a said plurality of flip-flop means to accept said data from said memory and to impress said data upon said data recording means for recording thereof.

7. An electronic format control buffer for simultaneously accepting electrically represented digital data over a plurality of channels at various rates, grouping said data into uniform blocks of digits, inserting parity check bits and recording said digits and bits at a fixed density suitable for continuous processing by an electronic computer, comprising; means to impress said digital data and phase reversed said digital data successively upon AND logics, OR logics, AND logics and OR logics to form said parity check bits; an addressable magnetic core matrix memory, greater than said plurality of counter-connected flip-flops connected to said memory, a second greater than said plurality of counter-connected flip-flops connected to said first greater plurality, a switch connected to each said flip-flop of said second greater plurality to allow preset counter operation thereof for writing said digital data in predetermined blocks into said memory in coaction with said first greater plurality, a duplicate said first greater plurality of flip-flops and a duplicate said second greater plurality of flip-flops and switches equivalently connected for reading said digital data from said memory; a check register of flip-flops connected as a counter and connected to said first greater plurality to detect error in counting of said flip-flops; check register logics connected to said check register to discard said digital data erroneously counted; oscillatory and frequency dividing means constituting a read clock to time said digital data read from said memory at a single rate; a delayed one shot connected to said read clock, an AND gate, a flip-flop to store a write pulse, said delayed one shot and said flip-flop connected to said AND gate to allow said write pulse to enter said memory only when said digital data is not being read out of said memory; an OR gate, a second flip-flop, an other flip-flop connected to said OR gate and to said second flip-flop, said OR gate connected to said second flip-flop, said OR gate, said second flip-flop and said other flip-flop coactive to produce a start pulse when a said predetermined block of digital data has been accumulated in said memory and to produce a stop pulse after a said predetermined block of digital data has been read out of said memory; one magnetic tape recorder; said OR gate, said second flip-flop and said other flip-flop connected to said data recorder for the control thereof; a second OR gate, a one shot and a third flip-flop, said second OR gate, said one shot and said third flip-flop connected to said recorder to produce a small blank gap after each said predetermined block of data has been recorded; a further second OR gate, one shot and third flip-flop combination similarly connected to produce a large blank gap after each file of plural predetermined blocks of digital data have been recorded; an output register having a said plurality of flip-flops adapted to accept said digital data from said memory and to impress said digital data upon said data recorder for the recording thereof.

8. Apparatus for grouping data into blocks and recording said data for continuous processing by a computer, comprising; a memory, a flip-flop register connected to said memory, preset means connected to said register for writing said data into said memory in predetermined blocks; a second flip-flop register connected to said memory for reading said data from said memory; means to time data read from said memory; relaxation means connected to said means to time data, gating means, said relaxation means and said gating means connected to allow said data to enter said memory only when said other data is not being read out of said memory; further relaxation means and further gating means, said further relaxation means and said further gating means coactive when a said predetermined block of data has been accumulated in said memory and coactive after a said predetermined block of data has been read out of said memory; said further relaxation means and said further gating means having connective means; more than one data recorder means; said further relaxation means and said further gating means connected to said data recording means for the intermittent control thereof through said connective means; reset means, still further relaxation means and still further gating means, said reset means connected to said still further relaxation means and said still further gating means, said more than one data recorder means connected to said still further relaxation means and to said still further gating means, said still further relaxation means and said still further gating means coactive with said reset means and with said more than one data recorder means to select one of said data recorder means for recording said predetermined blocks of data upon said reset means being actuated, and to select an other of said data recorder means for said recording when said one of said data recorder means has been filled with a prearranged amount of said predetermined blocks of data; and output register means to accept said data from said memory and to impress said data upon the operative said data recorder means.

9. An electronic buffer for accepting electrically represented data over a plurality of channels at various rates, grouping said data into blocks, inserting check bits and recording said data and bits at a density suitable for processing by an electronic computer, comprising; means to impress said data successively upon AND logics and OR logics to form said check bits; an addressable matrix memory, greater than said plurality of counter flip-flops connected to said memory, means connected to said flip-flops to write said data in predetermined blocks into said memory; a further plurality of flip-flops and means connected to said flip-flops equivalently connected to read said data from said memory; greater than said plurality of AND logics connected to each group of flip-flops to determine when said flip-flops have counted out said predetermined blocks; a read clock to time data read from said memory at one rate; delayed means connected to said read clock, an AND gate, means to store a write pulse, said delayed means and said means to store connected to said AND gate to allow said write pulse to enter said memory only when said data is not being read out of said memory; an OR gate, other flip-flop means, said other flip-flop means connected to said OR gate, said other flip-flop means and said OR gate coactive to produce a start pulse when a said predetermined block of data has been accumulated in said memory and to produce a stop pulse after a said predetermined block of data has been read out of said memory; plural data recorder means, said OR gate and said other flip-flop means connected to said data recorder means for the control thereof; reset means, plural AND gates, still other flip-flop means, said reset means connected to said still other flip-flop means, said plural AND gates interconnected to said still other flip-flop means, said plural data recorder means connected to said still other flip-flop means; said plural AND gates, said still other flip-flop means coactive with said reset means and said plural data recorder means to select one of said plural data recorder means for recording said predetermined blocks of data upon said reset means being actuated, and to select an other of said plural data recorder means for said recording when said one of said plural data recorder means has been filled with said predetermined blocks of data; and output register means having flip-flops adapted to accept data from said memory and to impress said data upon the operative said data recorder means.

10. An electronic format control buffer for simultaneously accepting electrically represented digital data over a plurality of channels at various rates, grouping said digital data into uniform blocks of digits, inserting parity check bits and recording said digits and bits at a fixed density suitable for continuous processing by an electronic computer, comprising; means to impress said digital data and phase-reversed said digital data successively upon AND logics, OR logics, AND logics and OR logics to form said parity check bits; an addressable magnetic core matrix memory, greater than said plurality of counter-connected flip-flops connected to said memory, a switch connected to each said flip-flop to allow preset counter operation thereof for writing said data in predetermined blocks into said memory; a duplicate plurality of flip-flops and switches equivalently connected for reading said data from said memory; greater than said plurality of AND logics connected to each group of said switches to determine when said flip-flops have counted said predetermined blocks; oscillatory and frequency dividing means constituting a read clock to time data read out at a single rate from said memory; a delayed one shot connected to said read clock, an AND gate and flip-flop to store a write pulse, said delayed one shot and said flip-flop connected to said AND gate to allow said write pulse to enter said memory only when said digital data is not being read out of said memory; an OR gate, a second flip-flop and an other flip-flop, said other flip-flop connected to said OR gate and to said second flip-flop, said OR gate connected to said second flip-flop, said OR gate, said second flip-flop, and said other flip-flop coactive to produce a start pulse when a said predetermined block of digital data has been accumulated in said memory and to produce a stop pulse after a said predetermined block of digital data has been read out of said memory; two magnetic tape data recorders, said OR gate, said second flip-flop and said other flip-flop connected to said data recorders for the control thereof; single reset means, plural AND gates, still an other flip-flop, a further one shot, said reset means connected to said still other flip-flop and said further one shot, said plural AND gates interconnected to said still other flip-flop and to said further one shot, said two data recorders connected to said still other flip-flop and to said further one shot coactive with said reset means and said two data recorders to select one of said two data recorders for recording said predetermined blocks of digital data at fixed bit density upon said reset means being actuated, to select the other of said two data recorders for said recording when said one of said two data recorders has been filled with said predetermined blocks of digital data, and to again select said one of said two data recorders when said other of said two data recorders has been filled with said predetermined blocks of digital data; an output register having a plurality of flip-flops adapted to accept said digital data from said memory and to impress said digital data upon the operative said data recorder.

11. An exclusively-electrical format control buffer for intermittently accumulating electrically represented digital data at non-uniform rates from a plurality of unrelated inputs, grouping said data into selected predetermined blocks of digits, and recording said digital data at fixed bit density on a strip medium suitable for rapid subsequent processing by an electrical computer by re-running said strip medium in said computer, comprising; a single multi-element static magnetic memory, two synchronously preset counters to automatically sequentially operate said memory, the first said counter connected to said memory for writing said digital data thereinto and the second said counter connected to said memory for reading said digital data thereoutof; readout clock means, a coincidence detector having a flip-flop, plural logic elements connected to said flip-flop, said detector connected to said inputs, to said readout clock means and to said memory to control the writing of said digital data thereinto, bit by bit, so as to inhibit by delay writing thereinto any intermittently accumulated said digital data simultaneously with reading out of said memory to insure recording said digital data at fixed bit density; strip-medium recording means, plural relaxation means connected to said memory, to said readout clock means and to said recording means for the transfer of digital data from said memory to said strip-medium; and further relaxation means connected to said readout clock means, to said second preset counter and to said recording means to control said recording means for recording said digital data at fixed bit density in said selected predetermined blocks suitable for rapid subsequent processing by an electrical computer by re-running said strip medium in said computer.

12. A format control buffer for accepting raw digital data from plural sources at various irregular rates, grouping said data into blocks of selected length, inserting check bits and recording said data and bits at fixed density upon a medium suitable for continuous processing by a computer at a rate more rapid than any of said irregular rates upon re-running said medium, comprising; a single addressable static matrix magnetic memory, logic means to impress said data upon said memory for sequential static storage thereof therein, a check bit generator having interconnected AND, NOT and OR logics, said generator connected to means for impressing bits upon said memory, write and read preset counters, said counters connected to said memory to control the block length of the write and read operations of said memory at a specific length for a given period of operation of said buffer; delay means and storage means effecting a delay a small fraction of the period between successive readings of bits connected in combination to inhibit simultaneous read and write operations in said memory by delaying writing any bit of said raw digital data into said memory until a simultaneously occurring read bit has been read, said combination to inhibit connected to said memory, a block time synchronizer connected to said combination to inhibit and to said counters, said combination to inhibit and said block time synchronizer coactive to read out said data and bits uninterruptedly in blocks from said memory; a readout register, a readout clock, said memory connected to said readout register and said readout clock connected to said readout register and to said combination to inhibit for timing thereof; a recorder, said recorder connected to said register for recording said digital data and bits at said fixed bit density upon said medium, and said recorder connected to said block time synchronizer and to said readout clock to be intermittently progressed, thereby to record said data and said bits in said blocks upon said medium one block at a time for continuously operated processing at said one more rapid rate by a computer with which said recorder is subsequently operated at a uniform speed.

13. Apparatus for grouping randomly timed intermittently occurring data into blocks of selected length and recording said data upon a record medium for subsequent continuous processing of the whole record at a rate rapid with respect to the occurrence of said data by a computer separate from said apparatus, comprising; a single static core memory, a flip-flop register connected to said memory, preset means connected to said register for sequentially writing said data into said memory for addressed static storage in predetermined blocks; a second flip-flop register connected to said memory for sequentially reading said data from said memory in the same said predetermined blocks; clock means to uniformly time data read from said memory; delay relaxation means connected to said means to time data, AND gating means connected to said relaxation means, said relaxation means and said gating means combination connected to said memory to allow a bit of said intermittently occurring data to enter said memory only when a bit of other said data is not being read out of said memory; further relaxation means and an OR gating means, said further relaxation means and said OR gating means coactive to produce a start command when one said predetermined block of data has been accumulated in said memory and coactive to produce a stop command after each said predetermined block of data has been read out of said memory; data recording means; means to connect said further relaxation means and said OR gating means to said data recording means for the control thereof; and additional gating and relaxation output means to accept said data from said memory and to impress said data upon said recording means for recording thereof in separate blocks of data upon said record medium at fixed bit density regardless of the original random timing thereof.

References Cited in the file of this patent

UNITED STATES PATENTS

| | | |
|---|---|---|
| 2,702,380 | Brustman et al. | Feb. 15, 1955 |
| 2,708,267 | Weidenhammer | May 10, 1955 |
| 2,814,676 | House | Nov. 26, 1957 |
| 2,850,234 | Bartelt | Sept. 2, 1958 |
| 2,907,004 | Li Chien et al. | Sept. 29, 1959 |
| 2,960,683 | Gregory et al. | Nov. 15, 1960 |